United States Patent [19]

Nke-Aka et al.

[11] Patent Number: 5,543,461

[45] Date of Patent: Aug. 6, 1996

[54] ENVIRONMENTAL STRESS CRACK RESISTANCE OF HIPS

[75] Inventors: Brenda C. Nke-Aka, Winchendon; Richard Delaney, Lunenburg, both of Mass.

[73] Assignee: Novacor Chemicals (International) SA, Fribourg, Switzerland

[21] Appl. No.: 209,062

[22] Filed: Mar. 9, 1994

[51] Int. Cl.$^6$ ............................ C08L 51/04; C08L 55/02
[52] U.S. Cl. .................. 525/74; 525/78; 525/79; 525/80; 525/83; 525/84; 525/86
[58] Field of Search .................... 525/74, 79, 78, 525/83, 84, 80, 86, 71

[56] References Cited

U.S. PATENT DOCUMENTS

| 4,985,498 | 1/1991 | Shirodkar | 525/86 |
| 5,331,048 | 7/1994 | Hasselbring | 525/98 |

OTHER PUBLICATIONS

"Chevron Polystyrene Extrusion Grade Resins" data sheet, Chevron Chemical Company, (Dec./90).
"Engineered HIPS Grades Become Candidates for ABS Replacement", Karen F. Lindsay, Modern Plastics, (Feb. 1992).
"Enter a New Crop of Enhanced HIPS", Plast. Technol.; 39, No. 6, Jun. 1993, p. 25/7.

*Primary Examiner*—James J. Seidleck
*Assistant Examiner*—M. L. Warzel
*Attorney, Agent, or Firm*—Bruce E. Harang

[57] ABSTRACT

High impact polystyrene (HIPS) and other impact modified styrenic polymers such as ABS and MBS tend to suffer from environmental stress cracking. On extended exposure to oily or fatty substances the plastic tends to craze, then crack and finally break. Unfortunately, a number of applications for impact modified polymers is in areas where there is a high potential to contact with oily or fatty substances. The environmental stress crack resistance (ESCR) of impact modified styrenic polymers may be increased by increasing the particle size of the impact modifier and including a low molecular weight polybutene.

18 Claims, No Drawings

ENVIRONMENTAL STRESS CRACK RESISTANCE OF HIPS

FIELD OF THE INVENTION

The present invention relates to compositions of rubber or impact modified thermoplastics. More particularly, the present invention relates to impact modified thermoplastics having a high environmental stress crack resistance (ESCR).

BACKGROUND OF THE INVENTION

Rubber or impact modified (or resistant) thermoplastics such as high impact polystyrene (HIPS), acrylonitrile-butadiene-styrene plastic (ABS) and methyl methacrylate-butadiene-styrene plastics (MBS) have been known for a significant period of time. These rubber modified polymers comprise a small amount, typically from about 3 to 15 weight % of a rubbery substrate polymer onto which is grafted at least a portion of a superstrate polymer. The polymers are useful in a wide range of applications. However, the polymers tend to be subject to a significant loss of physical properties when subjected to long chain oils and/or fats. This is known as environmental stress cracking (ESC). The problem may exhibit itself first as a hazing of the plastic and on prolonged exposure to such oils or fats the plastics may crack or even break into several pieces. Unfortunately, a fairly significant market for thermoplastics is in housewares which are subject to chemicals which tend to cause ESC such as cleaners and in some cases fatty or oily food. To date, the thermoplastic having the best ESCR that Applicants are aware of, is Chevron's HIPS grade 6755. After analysis of the Chevron product, Applicants have concluded that the product contains from about 2 to 3 weight % of polybutene and has a dispersed rubbery phase having a volume average particle diameter of between 4 and 4.5 microns.

Applicants are also aware of some trade literature, also by Chevron, which suggests that polybutene may be useful to enhance the ESCR of some plastics.

Applicants have been unable, after a search of various computerized patent and literature databases to find any clear references disclosing the combination of large particle size of the rubbery substrate and the use of polybutene.

The present invention seeks to provide a rubber modified thermoplastic having enhanced ESCR.

SUMMARY OF THE INVENTION

The present invention provides a rubber modified graft thermoplastic composition comprising:

1. from 99 to 96 weight % of a rubber modified thermoplastic comprising:
    (a) from 4 to 15 weight % of a substrate polymer which is a co- or homo-polymer selected from the group consisting of $C_{4-6}$ conjugated diolefins; and
    (b) from 96 to 85 weight % of a superstrate polymer at least a portion of which has been grafted to said substrate polymer, said superstrate polymer comprising a co- or homo-polymer of one or more monomers selected from the group consisting of: $C_{8-12}$ vinyl aromatic monomers which are unsubstituted or substituted by a $C_{1-4}$ alkyl radical; $C_{1-8}$ alkyl and hydroxy alkyl esters of $C_{3-6}$ ethylenically unsaturated carboxylic acids; acrylonitrile; methacrylonitrile; and maleic anhydride;

wherein in said rubber modified thermoplastic said substrate polymer is distributed throughout a matrix of said superstrate polymer in particles having a number average particle size from 6 to 12 microns; and 2. from 1 to 4 weight % of polybutene having a number average molecular weight from 900 to 2000.

DETAILED DESCRIPTION

Environmental Stress Cracking is a significant problem throughout the plastics industry. There is an ASTM test method for determining the ESCR of ethylene plastics (ASTM D 1693) (as opposed to the styrenic plastics of the present invention). In the ethylene ESCR test the sample is "notched", stressed by bending it in a controlled or predetermined "U" shape to fit a jig or over a pipe, and then immersed in the material for which the ESCR is to be determined for that plastic (e.g. oils, fats, detergent or cleansers). The test measures the time for half of the samples to fail (i.e. break). Attempts have been made to apply this type of test to styrenic thermoplastic polymers however, the test appears to have a high degree of insensitivity. More particularly the test is able to clearly distinguish products with a very poor ESCR from all other products. That is, the test is unable to distinguish or predict the ESCR in actual use of or between a medium and a high ESCR material. As a result, one may expect a material to have a good ESCR based on the test while in use it has an average ESCR. Further, the test is unable to effectively distinguish between polymers having good or superior ESCR.

To be able to develop a meaningful understanding of the factors which affect ESCR, it was necessary for Applicants to develop a test procedure to distinguish between products having a good ESCR. Applicants have developed a test in which modified thermoplastics are subject to a stress without bending them in a "U" shape. In the test a compression molded sample is held vertically. The bottom of the sample is held in place. The top of the sample is attached to a rocker or lever arm which pivots on an axis which may be locked. The lever arm extends over the front (proximate side) and also over the back (distant side) of the pivot. A load (e.g. a variable load shot can) is attached to the distant end of the lever arm. The sample of plastic is coated with the chemical to be tested (e.g. oil or fat, typically 100% corn oil margarine) and a timer is turned on. The lever arm is released placing the sample under stress. When the sample breaks, the shot can falls and trips a switch stopping the timer. It was found that this device was much more sensitive to differences in ESCR between different samples.

The test is carried out a number of times on samples of a plastic. The time to break is then recorded. Then the time to failure of half of the samples may be calculated as follows:

$$F_{ESCR50} = e^{\frac{\sum_{1}^{N}(lnESCR)}{N}}$$

The above equation calculates the Environmental Stress Crack Resistance of the sample which is the time of failure due to Environmental Stress Cracking for 50% of the population of the sample being tested.

As used in this specification, the term or phrase "good ESCR" means a plastic tested in the above manner with 100% corn oil margarine; a 3,706 gram load and a distant lever arm of 15.0 cm and a proximate lever arm of 9.5 cm, having a calculated $F_{50\ ESCR}$ of from 8 to 15 hours.

As used in this specification, the term or phrase "excellent ESCR" means a plastic tested in the above manner having a calculated $F_{50\ ESCR}$ greater than 15 hours, typically from 18 to 25 hours.

The present invention is particularly suitable for use in association with rubber or impact modified thermoplastic polymers. Typically such polymers comprise a rubbery substrate onto which is grafted at least part of a superstrate polymer.

The substrate may be a rubbery polymer containing an ethylenic unsaturation. Preferably the rubbery substrate is a co- or homo-polymer of one or more $C_{4-6}$ conjugated diolefins. A preferred rubbery substrate is polybutadiene. The polybutadiene may be a medium or high cis-polybutadiene. Typically the high cis-polybutadiene contains not less than 95%, preferably more than about 98 weight % of the polymer in the cis-configuration. Typically medium cis-polybutadiene has a cis content from about 60 to 80, preferably from about 65 to 75 weight %.

In accordance with the present invention there is a concurrent need to obtain large particles of the rubbery polymer dispersed throughout the thermoplastic matrix. A combination of one or more approaches may be used to obtain the required particle size distribution.

One approach is to use a rubbery polymer having a high viscosity when dissolved in the monomer(s) which are polymerized to form the thermoplastic matrix. Typically, the higher the molecular weight of a polymer, the higher the viscosity of a solution of that polymer. High molecular weight polybutadiene may have a weight average molecular weight (Mw) from about 260,000 to about 300,000, preferably from 270,000 to 280,000.

Suitable polybutadiene rubbers are commercially available from a number of sources including Miles Rubber Corporation, Bayer AG and Firestone. A particularly useful rubber is Firestone's DIENE® 70.

The second approach is to use a low shear stirrer in the "prepolymerization vessel". Typically, in the manufacture of HIPS and similar impact modified thermoplastics, from about 1 to 20, preferably from about 4 to 15, most preferably from about 4 to 10 weight % of the rubber substrate is dissolved in (infinitely swollen with) a mixture of one or more monomers such as styrene, and diluent such as ethylbenzene. The solution in which the rubbery substrate forms a continuous or co-continuous phase is subject to shear and polymerized until the rubber phase volume and the polymer phase volume are about equal (usually from about 5 to 20% conversion). Then the solution undergoes inversion and the continuous phase becomes the resin phase (a mixture of monomer and thermoplastic polymer) throughout which is distributed the rubber phase as discrete particles. If a relatively low shear is used in the "prepolymerization vessel", relatively large particles of the rubbery phase are formed. Low shear may be obtained by using a conventional "paddle" type stirrer at low rates of rotation such as less than about 15, most preferably less than about 10 RPM. In the alternative, a low shear agitator such as a helix at low rates of rotation such as less than 35, most preferably less than 30 RPMs may be used. Preferably a combination of low shear in the prepolymerizer and a relatively high solution viscosity rubber are used.

It should be noted that the particle size of the dispersed rubbery phase or the substrate for the graft thermoplastic does not become fixed until the rubber is substantially crosslinked. Generally, this does not occur until the final stages of polymerization when the conversion of the thermoplastic is above about 70%, preferably greater than 80%. Accordingly, care should be used to ensure that an excessive shear rate is not used in subsequent reactors which will result in a loss or reduction of the particle size.

The rubber particles should have a particle size such that the volume average particle size diameter of the particles is from 6 to 12, preferably from 8 to 10 microns. The volume average particle diameter is given by the ratio of the fourth moment of the particle size distribution to the third moment of the particle size distribution.

$$\text{Volume Average diameter} = \frac{\Sigma n_i d_i^4}{\Sigma n_i d_i^3}$$

wherein $n_i$ is the number of all particles having diameter $d_i$ summed over all particle diameters.

The superstrate thermoplastic polymer may be a polymer formed by the polymerization of one or more monomers selected from the group consisting of: $C_{8-12}$ vinyl aromatic monomers which are unsubstituted or substituted by a $C_{1-4}$ alkyl radical; $C_{1-8}$ alkyl and hydroxy alkyl esters of $C_{3-6}$ ethylenically unsaturated carboxylic acids; acrylonitrile; methacrylonitrile; and maleic anhydride.

The superstrate may be a homopolymer of one or more $C_{8-12}$ vinyl aromatic monomers selected from the group consisting of styrene, α-methyl styrene, p-methyl styrene and t-butyl styrene, preferably styrene.

The superstrate may be a high heat styrenic. That is, it may comprise: from 85 to 95 weight % of one or more of the above noted $C_{8-12}$ vinyl aromatic monomers which are unsubstituted or substituted by a $C_{1-4}$ alkyl radical; and from 5 to 15 weight % of maleic anhydride.

The superstrate polymer may be a copolymer of one or more $C_{8-12}$ vinyl aromatic monomers which are unsubstituted or substituted by a $C_{1-4}$ alkyl radical and one or more $C_{1-8}$ alkyl or hydroxy alkyl, preferably $C_{1-4}$ alkyl esters, of a $C_{3-6}$ ethylenically unsaturated carboxylic acid. Suitable and preferred $C_{8-12}$ vinyl aromatic monomers have been discussed above. Suitable alkyl esters of ethylenically unsaturated carboxylic acids are the esters of acrylic and methacrylic acid. Particularly useful esters include methyl methacrylate, ethyl methacrylate, methyl acrylate, ethyl acrylate and butyl acrylate. Most preferably, the ester is selected from the group consisting of methyl methacrylate and ethyl acrylate. Useful polymers include those comprising from 80 to 50 weight % of the $C_{8-12}$ vinyl aromatic monomer and from 20 to 50 weight % of the ester.

The superstrate may be a high heat polymer of one or more $C_{8-12}$ vinyl aromatic monomers which are unsubstituted or substituted by a $C_{1-4}$ alkyl radical and one or more $C_{1-8}$ alkyl or hydroxy alkyl esters of a $C_{3-6}$ ethylenically unsaturated carboxylic acid. Typically such polymers comprise from 15 to 50 weight % of one or more $C_{1-8}$ alkyl or hydroxy alkyl esters of a $C_{3-6}$ ethylenically unsaturated carboxylic acid; from 80 to 35 weight % of one or more $C_{8-12}$ vinyl aromatic monomers which are unsubstituted or substituted by a $C_{1-4}$ alkyl radical and from 5 to 15 weight % of maleic anhydride. Suitable $C_{8-12}$ vinyl aromatic monomers which are unsubstituted or substituted by a $C_{1-4}$ alkyl radical have been discussed above. Suitable ester monomers have been discussed above.

The superstrate polymer may comprise from 10 to 30 weight % of one or more monomers selected from the group consisting of acrylonitrile and methacrylonitrile and from 90 to 70 weight % of one or more monomers selected from the group consisting of $C_{8-12}$ vinyl aromatic monomers which are unsubstituted or substituted by a $C_{1-4}$ alkyl radical.

Suitable vinyl aromatic monomers have been discussed above.

The polymers of the present invention may be prepared in a conventional process for the polymerization of a rubber modified high impact thermoplastic polymer. Typically, the rubbery substrate polymer, most preferably a high molecular weight polybutadiene having a medium cis-configuration, is dissolved in one or more of the monomers which are polymerized to form the superstrate polymer and optionally a diluent, such as ethyl benzene. The resulting solution may be polymerized thermally by the application of heat only or by the use of initiators which generate free radicals. The initiators may be difunctional initiators having two different functional groups which decompose at different temperatures to increase the polymer conversion rate without negatively affecting molecular weight. Such difunctional initiators are well known and are described, for example, in the trade literature of the Pennwalt Corporation.

The solution of rubbery polymer and monomers which form the thermoplastic superstrate are polymerized in the "prereactor" under low shear until the solution undergoes phase inversion to yield a large particle size syrup (e.g partially polymerized monomers and thermoplastic having dispersed therethrough the rubber substrate polymer in particulate form). The syrup is then fed into either a tower reactor and is polymerized as the syrup passes down the tower or into a chain typically of at least two horizontal reactors in which the syrup is polymerized as it passes through the chain. In both systems the conversion of the syrup leaving the tower or the last horizontal reactor should typically be not less than about 70%.

The polymer then enters a devolatilization stage. Typically, the polymer is heated to a higher temperature than in the reactors to raise the vapour pressure of the residual monomers and diluent and to drive the conversion to higher degrees. The polymer melt is then exposed to a zone of reduced pressure, generally in a vertical orientation, and the polymer melt descends through this zone in the form of strands (the so-called falling strand devolatilizers). This procedure may, but not necessarily is, performed several times. The resulting polymer is then extruded through a die, into a cooling bath, typically water, and then dried usually by jets of air and fed to a chopper where it is cut into pellet form.

The second component in the compositions of the present invention is polybutene. The polybutene may have a number average molecular weight (Mn) from about 900 to 2000, preferably from about 900 to 1300. The polybutene is added to the rubber modified thermoplastic in amounts from 1 to 4, preferably from 1 to 3 weight %.

The polybutene may be added to the rubber modified thermoplastic in a number of different manners. The thermoplastic pellets may be extrusion blended with the polybutene and then pellitized. The polybutene may be injected into the thermoplastic melt in or during its formation. Preferably the polybutene may be injected into the melt of the thermoplastic subsequent to formation (e.g. polymerization) and prior to extrusion from the die into a cooling medium (typically water).

The resulting pellets of thermoplastic in accordance with the present invention may then be processed in the usual manner such as by injection molding or thermoforming.

The present invention will now be illustrated by the following non-limiting examples in which, unless otherwise indicated, parts means parts by weight (e.g. grams).

Thermoplastics

A series of three thermoplastics were prepared. The substrate was polybutadiene and the superstrate was polystyrene. In two of the high impact polystyrene samples, the substrate was a high cis low viscosity polybutadiene. In two of the high impact polystyrene samples, the substrate was medium cis high viscosity polybutadiene. The samples were prepared under low shear conditions.

The samples were analyzed for particle size using a photosedimentation rate procedure. The particle size was determined using an Horiba photosedimentometer in which a dilute solution (0.3%) of HIPS in a solvent (MEK/DMF 60:40) is centrifuged to remove components of various particle size. The light transmittance of the supernatant solution is recorded. This measures the loss or decrease in the scattering of light as various segments of particle size of the rubbery phase is removed from the solution. The overall results of the analysis then yields the volume average particle diameter.

For comparative purposes, Applicants also analyzed several competitive products which are indicated as being suitable for use in ESCR applications.

Applicants blended their resins with various amounts of polybutene and analyzed the comparative samples for polybutene.

Each sample of HIPS was compression molded and formed into 10 test specimens and tested using the device described in the disclosure above. The time until failure of the sample was recorded. Then $F_{50\ ESCR}$ was calculated as indicated above. The results of the analysis of particle size, weight % polybutene and $F_{50}$ ESCR are set forth in table 1 below.

TABLE 1

| SAMPLE | VOLUME AVERAGE PARTICLE SIZE MICRONS | POLYBUTENE WT % | $F_{50\ ESCR}$ CALCULATED HOURS |
|---|---|---|---|
| NOVACOR - 1 | 1.3 | 0 | 0.8 |
| NOVACOR - 2 | 1.3 | 1.8 | 1.9 |
| NOVACOR - 3 | 8.3 | 0 | 3.1 |
| DOW - 469R | 6.0 | 0 | 4.6 |
| CHEVRON - 6755 | 4.2 | 2.6 | 12.1 |
| NOVACOR - 4 | 9.2 | 2.0 | 21.4 |

The table demonstrates that:

1. small amounts of polybutene significantly increase the ESCR of HIPS (Novacor-1; Novacor-2; and CHEVRON-6755);

2. increasing particle size increases ESCR of HIPS (Novacor-1; Novacor-3; and DOW-469R); and 3. large particle size and polybutene have a synergistic effect (DOW-469R; CHEVRON-6755; and Novacor-4).

What is claimed is:

1. A rubber modified graft thermoplastic composition comprising:
   (a) from 99 to 96 weight % of a rubber modified thermoplastic comprising:
      (i) from 4 to 15 weight % of a substrate polymer which is a co- or homo-polymer selected from the group consisting of $C_{4-6}$ conjugated diolefins; and
      (ii) from 96 to 85 weight % of a superstrate polymer at least a portion of which has been grafted to said substrate polymer, said superstrate polymer comprising a co- or homo-polymer of one or more monomers selected from the group consisting of: $C_{8-12}$ vinyl aromatic monomers which are unsubstituted or substituted by a $C_{1-4}$ alkyl radical; $C_{1-8}$ alkyl and hydroxy alkyl esters of $C_{3-6}$ ethylenically unsaturated carboxylic acids; acrylonitrile; methacrylonitrile; and maleic anhydride;
   wherein in said rubber modified thermoplastic said substrate polymer is distributed throughout a matrix of said superstrate polymer in particles having a number average particle size from 6 to 12 microns; and
   (b) from 1 to 4 weight % of polybutene having a number average molecular weight from 900 to 2000.

2. A rubber modified graft thermoplastic composition according to claim 1, wherein said substrate polymer is distributed throughout a matrix of said superstrate polymer in particles having a number average particle size from 8 to 10 microns.

3. A rubber modified graft thermoplastic composition according to claim 2, wherein said polybutene is present in an amount from 1 to 3 weight %.

4. A rubber modified graft thermoplastic composition according to claim 3, wherein said polybutene has a number average molecular weight from 900 to 1300.

5. A rubber modified graft thermoplastic composition according to claim 4, wherein said substrate polymer is a homopolymer of butadiene.

6. A rubber modified graft thermoplastic composition according to claim 5, wherein said substrate polymer has a weight average molecular weight from 60,000 to 300,000.

7. A rubber modified thermoplastic composition according to claim 6, wherein said substrate polymer is present in an amount from 4 to 10 weight %.

8. A rubber modified thermoplastic composition according to claim 7, wherein said substrate polymer has a cis-content of from 65 to 75%.

9. A rubber modified graft thermoplastic composition according to claim 8, wherein said superstrate polymer is polystyrene.

10. A rubber modified graft thermoplastic composition according to claim 8, wherein said superstrate polymer is a copolymer comprising from 5 to 15 weight % of maleic anhydride and from 95 to 85 weight % of styrene.

11. A rubber modified graft thermoplastic composition according to claim 8, wherein said superstrate polymer comprises from 20 to 50 weight % of one or more monomers selected from the group consisting of $C_{1-8}$ alkyl and hydroxy alkyl esters of $C_{3-6}$ ethylenically unsaturated carboxylic acids; and from 80 to 50 weight % of styrene.

12. A rubber modified graft thermoplastic composition according to claim 8, wherein said superstrate polymer comprises from 20 to 50 weight % of one or more monomers selected from the group consisting of $C_{1-4}$ alkyl esters of acrylic and methacrylic acid; and from 80 to 50 weight % of styrene.

13. A rubber modified graft thermoplastic composition according to claim 12, wherein in said superstrate polymer said $C_{1-4}$ alkyl esters of acrylic and methacrylic acid are selected from the group consisting of methyl methacrylate and ethyl acrylate.

14. A rubber modified graft thermoplastic composition according to claim 13, wherein said superstrate polymer is a copolymer of styrene and methyl methacrylate.

15. A rubber modified graft thermoplastic composition according to claim 8, wherein said superstrate polymer comprises from 15 to 50 weight % of one or more monomers selected from the group consisting of $C_{1-8}$ alkyl and hydroxy alkyl esters of $C_{3-6}$ ethylenically unsaturated carboxylic acids; from 80 to 35 weight % of styrene; and from 5 to 15 weight % of maleic anhydride.

16. A rubber modified graft thermoplastic composition according to claim 8, wherein said superstrate polymer comprises from 15 to 50 weight % of one or more monomers selected from the group consisting of $C_{1-4}$ alkyl esters of acrylic and methacrylic acid; from 80 to 35 weight % of styrene; and from 5 to 15 weight % of maleic anhydride.

17. A rubber modified graft thermoplastic composition according to claim 6, wherein said superstrate polymer comprise from 10 to 30 weight % of one or more monomers selected from the group consisting of acrylonitrile and methacrylonitrile and from 90 to 70 weight % of one or more monomers selected from the group consisting of $C_{8-12}$ vinyl aromatic monomers which are unsubstituted or substituted by a $C_{1-4}$ alkyl radical.

18. A rubber modified graft thermoplastic composition according to claim 6, wherein said superstrate polymer comprises from 10 to 30 weight % of one or more monomers selected from the group consisting of acrylonitrile and methacrylonitrile and from 90 to 70 weight % of styrene.

* * * * *